United States Patent
Kramer et al.

(10) Patent No.: US 6,351,106 B1
(45) Date of Patent: Feb. 26, 2002

(54) STATIC VOLTAGE REGULATOR AND CONTROLLER

(75) Inventors: William O. Kramer, Frazer; Alireza Daneshpooy, Exton, both of PA (US)

(73) Assignee: Silicon Power Corporation, Exton, PA (US)

( * ) Notice: Subject to any disclaimer, the term of this patent is extended or adjusted under 35 U.S.C. 154(b) by 0 days.

(21) Appl. No.: 09/676,450

(22) Filed: Sep. 29, 2000

(51) Int. Cl.[7] ............................. G05F 1/16; G05F 1/26
(52) U.S. Cl. ..................................... 323/258; 323/263
(58) Field of Search ................................. 323/258, 340, 323/259, 255, 344, 263

(56) References Cited

U.S. PATENT DOCUMENTS

| | | |
|---|---|---|
| 3,970,918 A | 7/1976 | Cooper |
| 4,030,015 A * | 6/1977 | Herko et al. |
| 4,156,174 A * | 5/1979 | Specht |
| 4,453,122 A | 6/1984 | Johnson et al. |
| 4,716,357 A | 12/1987 | Cooper |
| 4,774,451 A * | 9/1988 | Mehnert et al. |
| 4,860,145 A * | 8/1989 | Klingbiel |
| 5,329,222 A | 7/1994 | Gyugyi et al. |
| 5,883,796 A | 3/1999 | Cheng et al. |

OTHER PUBLICATIONS

Eduardo Alegria, Afroz Khan, Janos Rajda and Shashi Dewan "Static Voltage Regulator (SVR)—Ride Through Support For Semiconductor Facilities", Powersystems World '98 Power Quality Conference, Santa Clara, CA, Nov. 1998.

* cited by examiner

Primary Examiner—Adolf Deneke Berhane
(74) Attorney, Agent, or Firm—Blank Rome Comisky & McCauley LLP

(57) ABSTRACT

A voltage regulator apparatus comprises a transformer having a primary winding and a secondary winding, a plurality of further windings selectively connected to one of the primary winding and secondary winding, and a plurality of solid state selectors respectively coupled to each of the plurality of further windings to one of i) connect the further winding in series with the primary winding or the secondary winding and ii) bypass the further winding.

22 Claims, 17 Drawing Sheets

$V_{0-A}, V_{0-B}, V_{0-C}$ = PHASE-NEUTRAL VOLTAGE BEFORE BOOSTING/BUCKING $V_{0-A'}, V_{0-B'}, V_{0-C'}$ = PHASE-NEUTRAL VOLTAGE AFTER BOOSTING/BUCKING $V_{A'-B'}, V_{B'-C'}, V_{C'-A'}$ = PHASE-PHASE VOLTAGE AFTER BOOSTING/BUCKING

PRIMARY VOLTAGES
——— BEFORE DISTURBANCE
- - - - - DURING DISTURBANCE

SECONDARY VOLTAGES
——— MAIN TRANSFORMER OUTPUT (P-N)
- - - - - OUTPUT AFTER GROUND TRANSFORMER

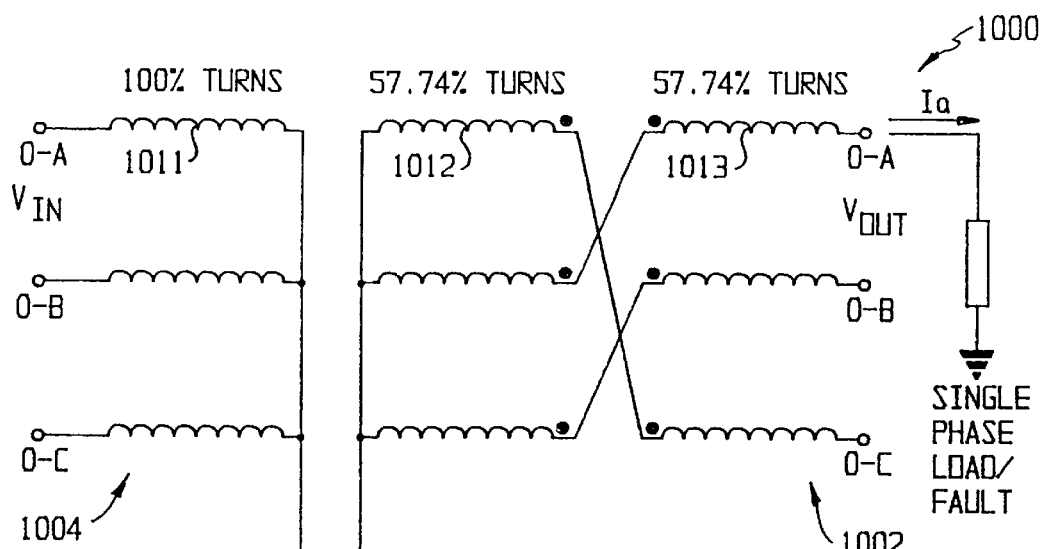
FIG. 10A
FIG. 10B
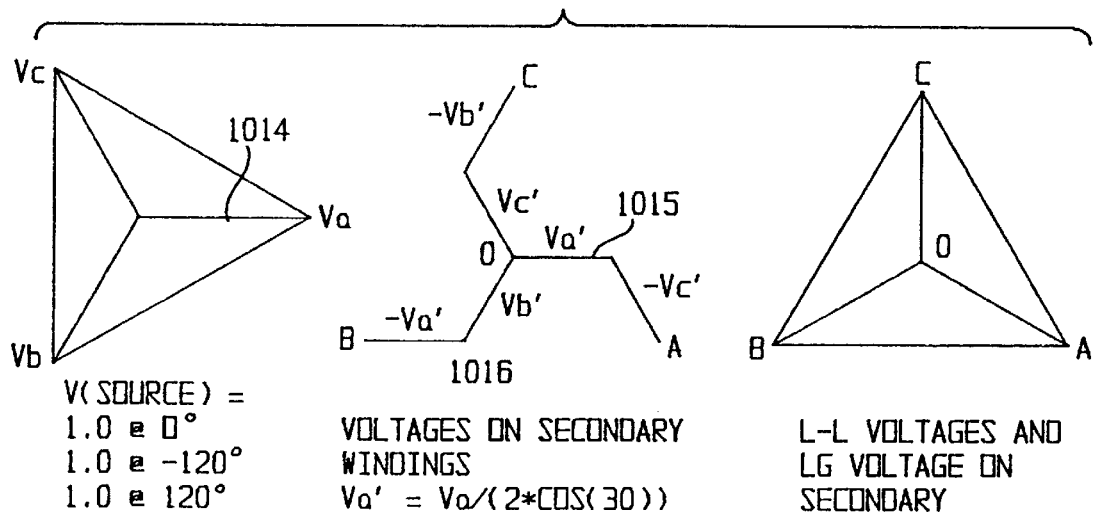
V(SOURCE) =
1.0 ∠ 0°
1.0 ∠ −120°
1.0 ∠ 120°
VOLTAGES ON SECONDARY
WINDINGS
Va' = Va/(2*COS(30))
L-L VOLTAGES AND
LG VOLTAGE ON
SECONDARY
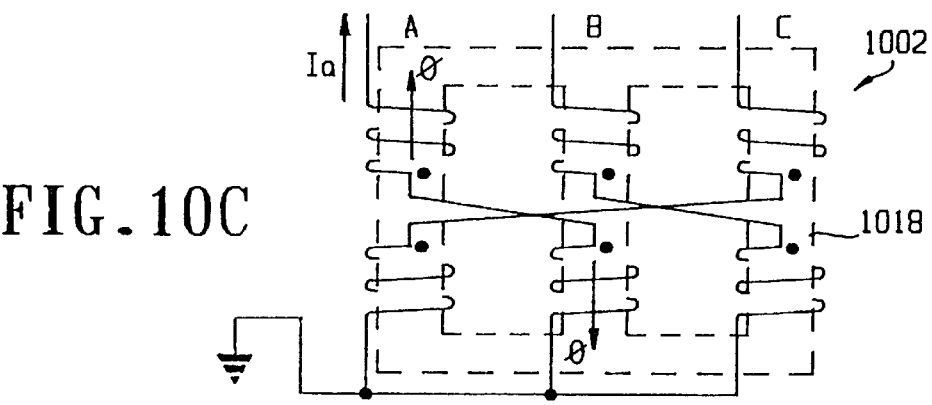
FIG. 10C IDEAL BUCK/BOOST FOR SINGLE SECONDARY WINDING PER PHASE. NOTE THAT STAR POINT OF OUTPUT IS NOT AT CENTER OF TRIANGLE A-B-C.

IDEAL BUCK/BOOST FOR SPLIT SECONDARY WINDING IN EACH PHASE. NOTE THAT THE STAR POINT OF OUTPUT IS AT CENTER OF TRIANGLE A-B-C.

SOURCE AND FAULT VOLTAGES.
PHASE SHIFT IN VOLTAGES
FOR PHASE B AND C.

ATTEMPT TO FIND AN "IDEAL" SOLUTION FAILS BECAUSE THE SOLUTION REQUIRES PHASE A TO HAVE A NEGATIVE VOLTAGE.

ACTUAL OUTPUT OF THE SSVR IS LIMIITED BY THE MINIMUM VOLTAGE WHICH CAN BE REALIZED ON PHASE A AND BY THE NEED TO LIMIT THE MAXIMUM L-L VOLTAGE ON PHASES A-B AND C-A.

SOURCE AND FAULT VOLTAGES. PHASE SHIFT IN VOLTAGES FOR PHASE B AND C.

ATTEMPT TO FIND AN "IDEAL" IS SUCCESSFUL. PHASE B AND C ARE BOOSTED, PHASE A IS REDUCED.

ACTUAL OUTPUT OF THE SSVR IS LIMIITED BY THE MINIMUM VOLTAGE WHICH CAN BE REALIZED ON PHASE A AND BY THE NEED TO LIMIT THE MAXIMUM L-L VOLTAGE ON PHASES A-B AND C-A.

STATIC VOLTAGE REGULATOR AND CONTROLLER

FIELD OF THE INVENTION

The present invention relates to voltage regulators, and more specifically to a sub-cycle static voltage regulator that is able to adjust for input voltage anomalies in one cycle or less.

BACKGROUND OF THE INVENTION

It is recognized that commercial power systems are subject to various types of disturbances that adversely affect the operation of sensitive electrical equipment. These disturbances usually show up as "Sags" or "Swells" in the system voltage.

Disturbances in electrical utility supply networks (transmission and distribution) might be caused for a variety of reasons. Power equipment faults and insulation failures, line switchings, capacitor switchings, large transformer and motor energizations, and non-linear loads such as arc furnaces, variable speed drives, rectifiers, etc. are only a few such causes. Such transient disturbances, as distinguished from complete power failure, manifest themselves as momentary power supply interruptions, voltage sags, voltage transients, voltage magnitude variations, and harmonics. Thus, voltage sags and swells may be caused by failures or switchings within a particular transmission or distribution line.

Several methods are available for dealing with such sags and swells, but most methods have costs (on a per kW basis) that make them unattractive for large load applications. Examples of conventional power quality improvement technologies are uninterruptable power supplies (UPS) and dynamic voltage regulators (DVR). These types of devices require a DC to AC power converter of some type, however, leading to greater complexity and higher cost. Therefore, there is a recognized need for a high speed voltage regulation systems suitable for medium voltage (15 kV class) applications.

SUMMARY OF THE INVENTION

To solve the aforementioned disadvantages of conventional regulators, the present invention relates to a voltage regulator that is able to adjust for input voltage anomalies in one cycle or less. The regulator comprises a transformer having a primary winding and a secondary winding, a plurality of further windings selectively connected to the primary winding or secondary winding, and a plurality of solid state switches respectively coupled to each of the plurality of further windings to either i) connect the further winding in series with the primary winding or the secondary winding or ii) bypass the further winding.

According to one aspect of the present invention, the solid state switches are thyristors.

According to another aspect of the present invention, the switches are gate turn-off (GTO) devices.

According to yet another aspect of the present invention, the regulator transformer includes a tertiary winding.

According to a further aspect of the present invention, the regulator includes a controller to control the solid state switches.

These and other aspects of the invention are set forth below with reference to the drawings and the description of exemplary embodiments of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIGS. 10A–10C illustrate a transformer configuration and phasor diagram for a wye to zig-zag transformer;

DETAILED DESCRIPTION OF THE INVENTION

The exemplary Sub-Cycle Static Voltage Regulator (SSVR) is an electronically switched tap changing transformer, capable of restoring the 3-phase output voltage to its nominal value within 1 cycle or less after an input voltage anomaly, such as a sag, is first detected. In an exemplary embodiment of the present invention, the electronic switching may be accomplished using thyristors or Gate Turn-off devices, for example. The maximum correctable sag is based on the tap range provided in the transformer. In addition, the accuracy of the restored voltage is dependent on the minimum tap step. Within these limitations, however, the exemplary SSVR is capable of restoring the output voltage to its previous magnitude, and all phases will be equally spaced, both on a line to ground basis and on a line to line basis.

Figure 1:
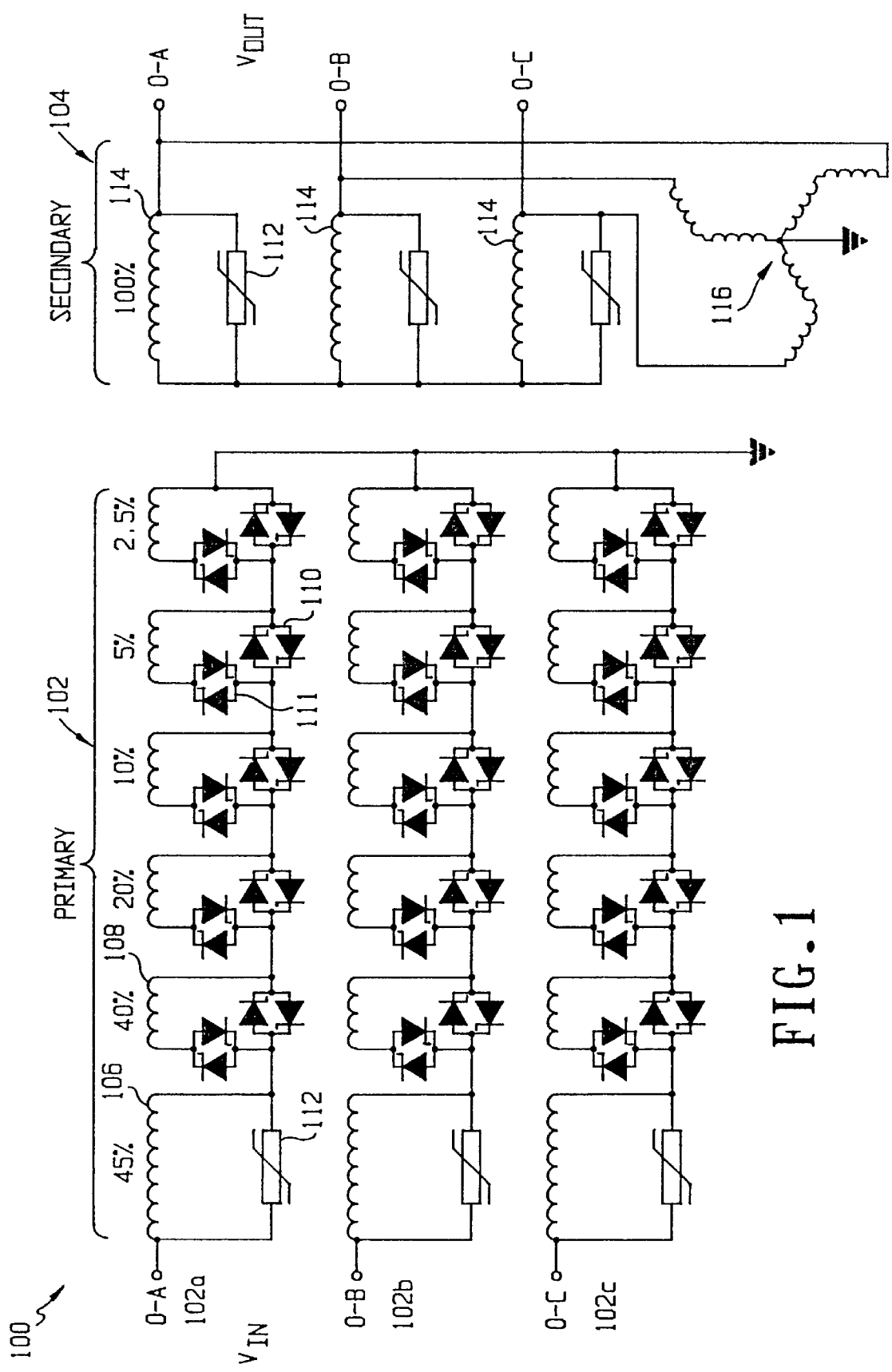
FIG. 1 is a schematic diagram of a first exemplary embodiment of the present invention.

FIG. 1 is a schematic diagram of a first exemplary embodiment of the present invention. In FIG. 1, SSVR 100 includes primary 102, secondary 104, and a separate grounding transformer 116. In the exemplary embodiment, SSVR 100 may include a two winding three-phase transformer, or three single phase two winding transformers as the primary 102 and secondary 104. Included in each leg 102a, 102b, 102c, of primary 102 are switching elements 110 connected in series with and parallel to multiple tap windings 108. The multiple tap windings 108 are coupled in series with one another and main primary winding 106. In a preferred embodiment, switching elements 110, 111 may be thyristors or gate turn off thyristors (GTO). In the exemplary embodiment, switching elements 110, 111 are used to either switch in (insert) or switch out (bypass) the individual tap windings 108.

As presently illustrated, to switch in a particular tap winding 108, switching element 110 is set open and switching element 111 is set closed. Alternatively, to switch out a tap winding 108, switching element 110 is set closed and switching element 111 is set open. The secondary 104 of the main transformer is ungrounded, but a ground may be derived via grounding transformer 116, if desired. In the exemplary embodiment, grounding transformer 116 is shown as a zigzag transformer, although other types of transformers may be used. In a preferred embodiment, surge arresters 112 may be provided on either or both the main primary windings 112 and secondary windings 114 to control voltage overshoot during recovery from a voltage sag.

Referring again to FIG. 1, in a preferred embodiment, the percentage of turns in primary 102 is greater than 100% if all the windings 106, 108 are considered. For optimum performance and use of the least number of tap windings, the tap windings should preferably be distributed in a binary fashion. A preferred turns distribution is 45% for the main winding 106 and 40%, 20%, 10%, 5% and 2.5% for the respective tap windings 108. This provides a wide range of selections to cover the anticipated voltage variations. The invention is not so limited, however, and the turns ratios for the main and tap windings may be varied as desired. The additional primary turns in the preferred embodiment permit the SSVR to increase (boost) and/or decrease (buck) the magnitude of each incoming phase voltage.

From the simple wye-wye circuit of FIG. 1, it is evident that the SSVR 100 may either increase (boost) or decrease (buck) the magnitude of each incoming phase voltage. In other words, the phase to neutral output voltages of SSVR 100 will always be in phase (approximately) with the phase to neutral voltages present at the input.

It is to be understood that various auxiliary circuits commonly needed to apply solid state switches, and known to those of ordinary skill in the art, such as snubbers, gate drives, etc, have been omitted from the figures for clarity.

Figure 2:
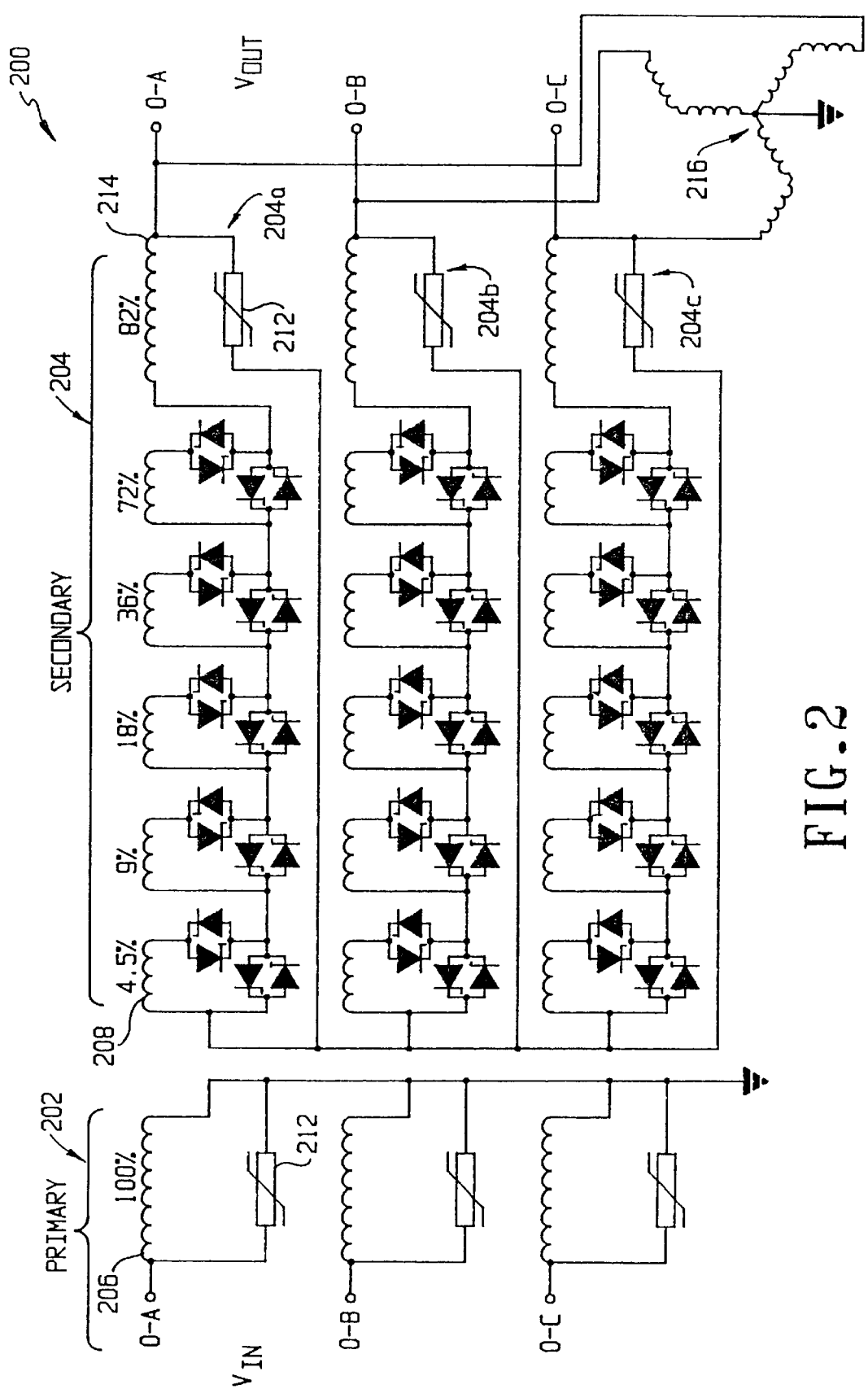
FIG. 2 is a schematic diagram of a second exemplary embodiment of the present invention.

FIG. 2 is a schematic diagram of a second exemplary embodiment of the present invention. In FIG. 2, SSVR 200 includes primary 202, secondary 204, and grounding transformer 216. FIG. 2 is similar to FIG. 1 except that tap windings 208 are included in the secondary (output) 204. Included in each leg 204a, 204b, 204c, of secondary 204 are switching elements 210, 211 connected in series with and parallel to multiple tap windings 208. The multiple tap windings 208 are coupled in series with one another and main secondary winding 214.

Similar to the first exemplary embodiment, the secondary 204 of the main transformer is ungrounded, but a ground may be derived via grounding transformer 216. In a preferred embodiment, surge arresters 212 may be provided on either or both the primary windings 206 and secondary windings 204 to control voltage overshoot during recovery from a voltage sag.

Figure 3:
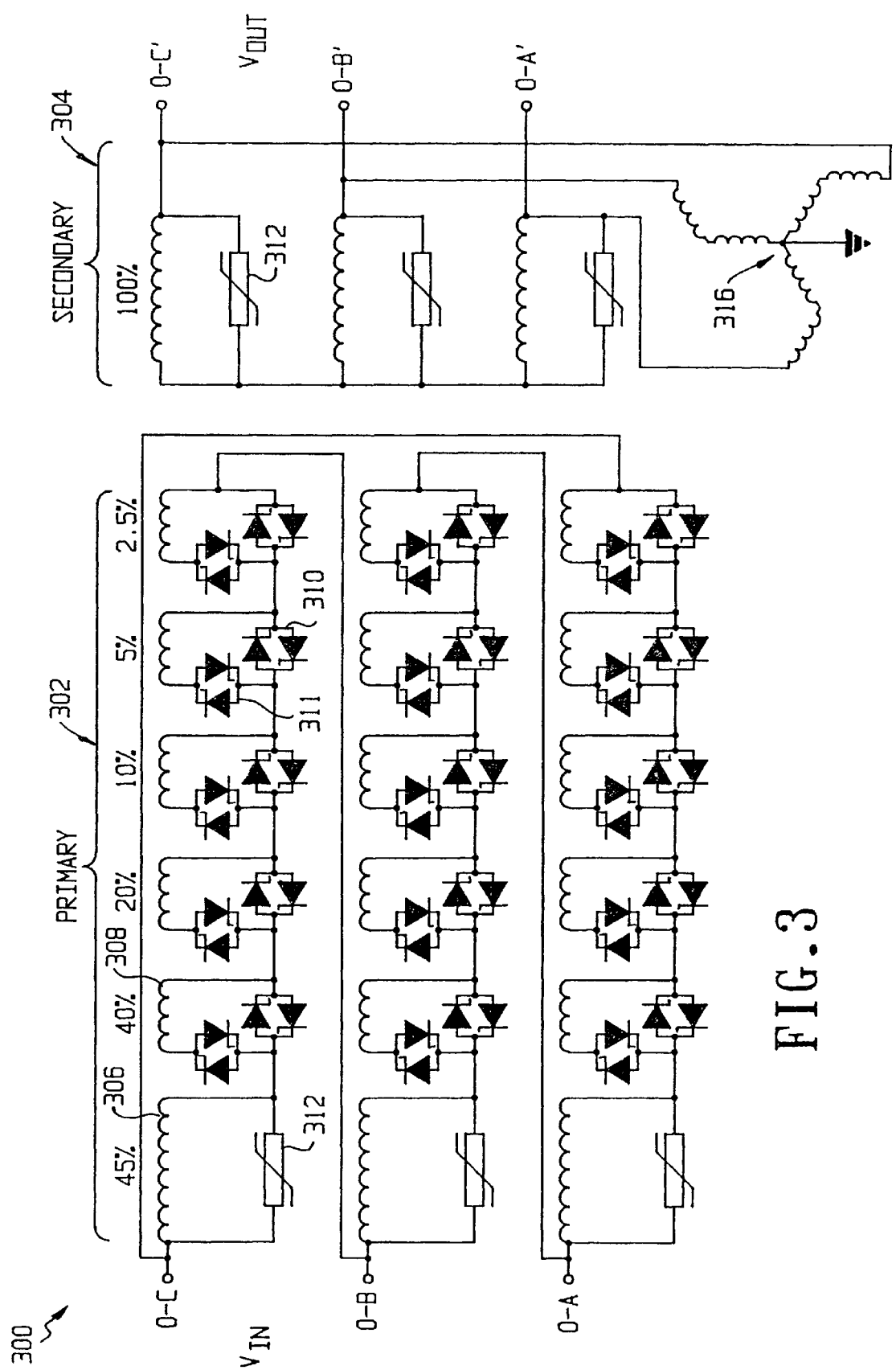
FIG. 3 is a schematic diagram of a third exemplary embodiment of the present invention.

FIG. 3 is a schematic diagram of a third exemplary embodiment of the present invention. In FIG. 3, SSVR 300 includes primary 302, secondary 304, and grounding transformer 316. FIG. 3 is similar to FIG. 1 except that the primary (input) windings are arranged in a delta configuration. In the exemplary embodiment, the tap windings 308 and associated switching elements 310, 311 are shown on the input side, but could equally well be on the output.

Figure 4:
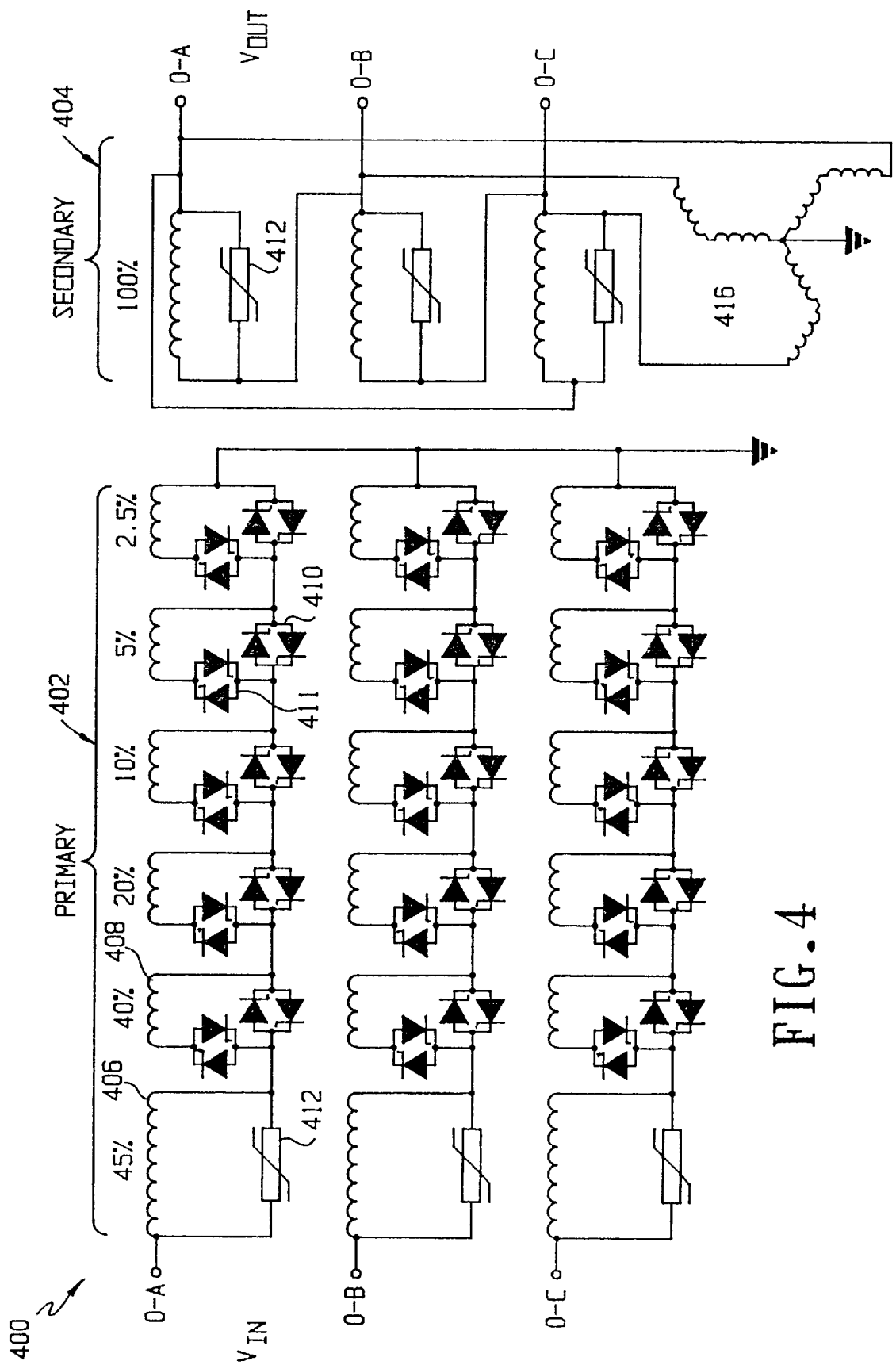
FIG. 4 is a schematic diagram of a fourth exemplary embodiment of the present invention.

FIG. 4 is a schematic diagram of a fourth exemplary embodiment of the present invention. In FIG. 4, SSVR 400 includes primary 402, secondary 404, and grounding transformer 416. FIG. 4 is similar to FIG. 1 except that the secondary is arranged in a Delta configuration. The taps windings 408 and associated switching elements 410, 411 are shown on the input, but could equally well be on the Secondary side.

Figure 5:
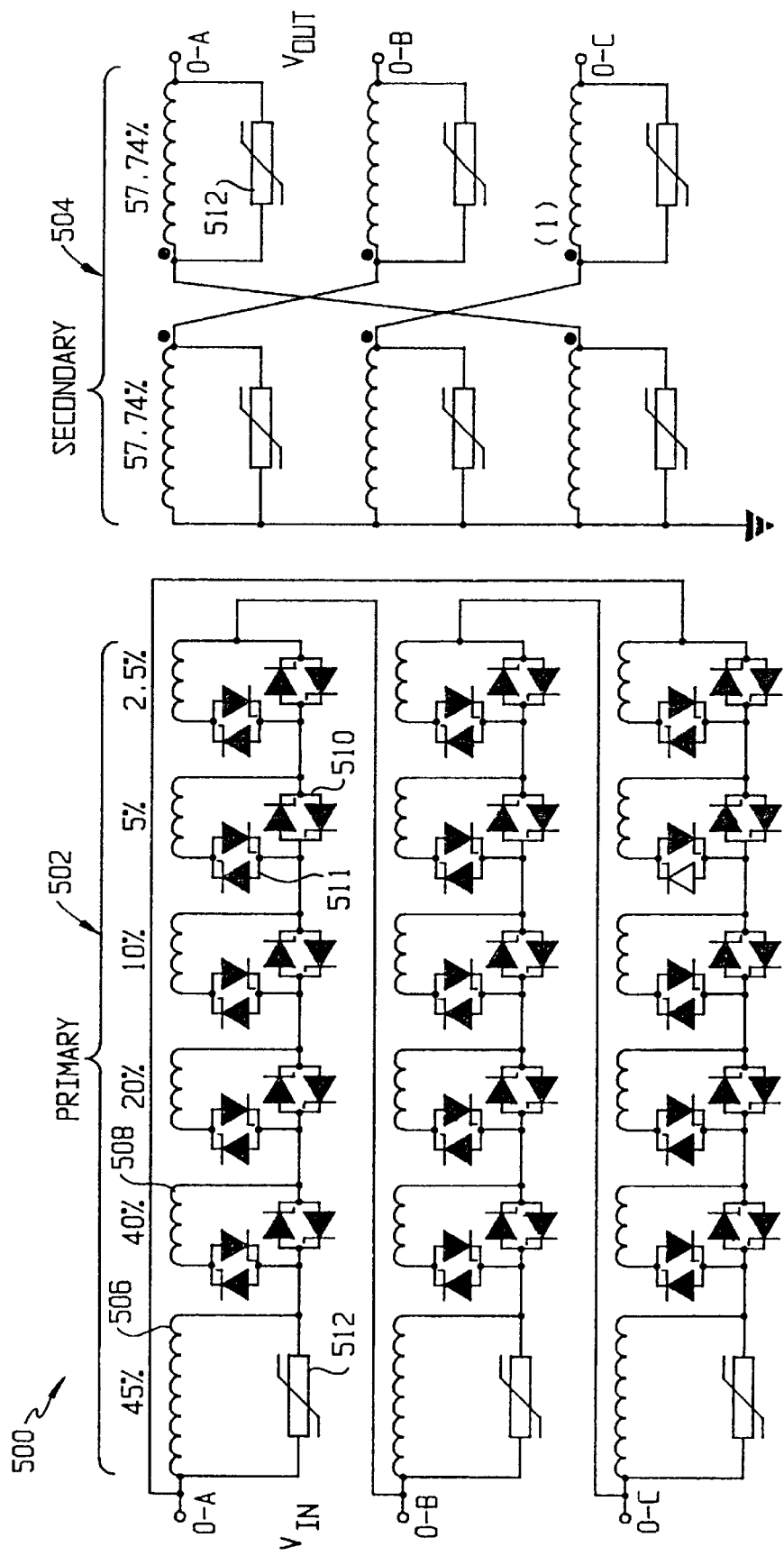
FIG. 5 is a schematic diagram of a fifth exemplary embodiment of the present invention.

FIG. 5 is a schematic diagram of a fifth exemplary embodiment of the present invention. In FIG. 5, SSVR 500 includes primary 502 and zigzag secondary 504. The inclusion of zigzag secondary 502 combines the function of the main output winding and the separate grounding transformer of previous embodiments. The primary 502 may be wound either as shown in a delta configuration or in a wye configuration according to system requirements. In addition, the tap windings 508 and associated switching elements 510, 511 may be placed on either the primary (preferred) or secondary. If the tap windings 508 and switching elements 510, 511 are placed on the secondary, however, two sets of tap windings and switches may be required for each phase.

Figure 6A:
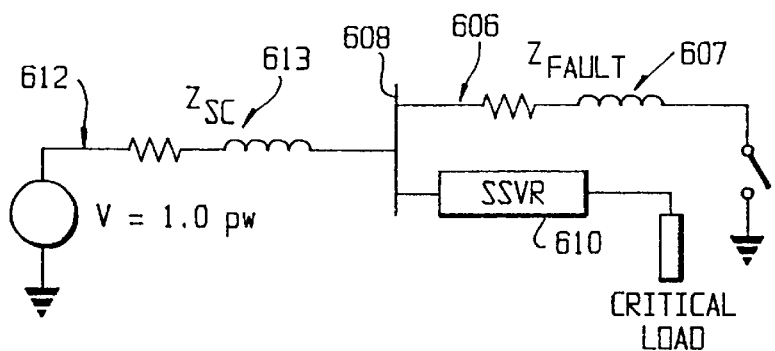
FIGS. 6A–6C are phasor diagrams illustrating input voltage phasors during a typical disturbance on a power system.
Figure 6B:
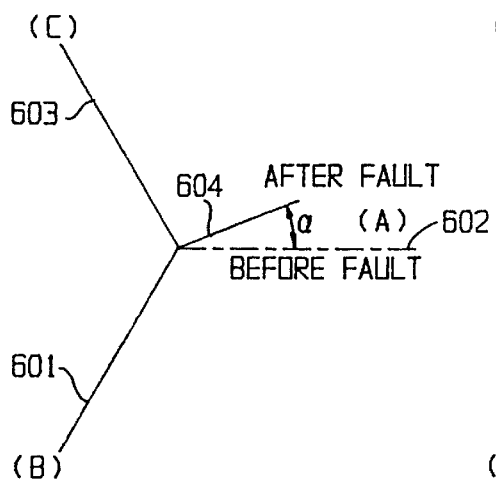
Figure 6C:
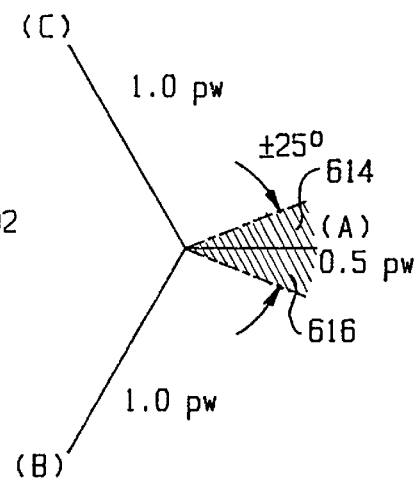

A typical up-stream disturbance is likely to produce both a reduction in magnitude (sag) and a phase shift in the incoming AC voltage as illustrated in FIGS. 6A–6C. As shown in FIG. 6A, a typical cause of power disturbances is a fault on another feeder 606 that is connected to a common bus 608 with the feeder 612 supplying critical load 610. In this case, source impedance $Z_{SC}$ 613 and the impedance to the fault $Z_{fault}$ 607 form a voltage divider, which significantly reduces the voltage, and likely produces a phase shift at the common bus. In FIG. 6B, the phase A voltage before the disturbance is indicated by reference 602 and the phase A voltage after the disturbance is indicated by reference 604. In this example, the phase voltage A is reduced by about 50% and shifted by approximately 25 degrees ($\alpha$). Note, that for simplicity of explanation, in this example there are no changes in phases B (601) and C (603). In other cases, a different sag and phase shift may occur, depending on the circuit parameters at the time of the fault. FIG. 6C illustrates an approximate range of phase shifts 614, 616 that may be expected for the type of line to ground faults illustrated in FIG. 6A. Table 1 tabulates these values for several different circuit parameters.

TABLE 1

| LOAD P.F. | X/R = 1 FA = 45° | X/R = 1 FA = 90° | X/R = 7 FA = 45° | X/R = 7 FA = 90° | X/R = 40 FA = 45° | X/R = 40 FA = 90° |
|---|---|---|---|---|---|---|
| 0.6 | 1° | 23° | −21° | 1° | −25° | −3° |
| 0.8 | 0° | 22° | −21° | 2° | −24° | −2° |
| 1.0 | −2° | 21° | −21° | 1° | −24° | −2° |
| −0.8 | −3° | 20° | −21° | 1° | −24° | −2° | where,

X/R is the ratio of the reactance to the resistance of the upstream system;

F/A is the fault angle—the angle between the voltage and the current in the line going to the fault.

It is desired that the SSVR produce a set of line-to-line output voltages that are essentially equal to the pre-fault voltage and spaced 120° apart. A technique for this transformation is shown in FIGS. 7, 8, and 9 and explained below.

Figure 7:
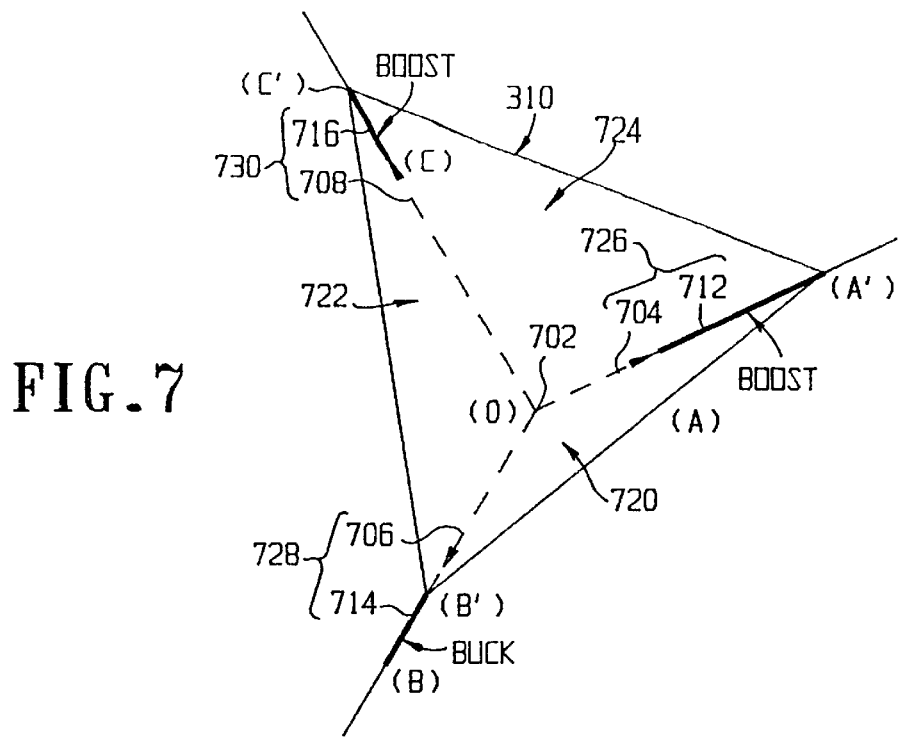
FIG. 7 is a phasor diagram illustrating restoration of the three-phase voltage according to an exemplary embodiment of the present invention.
Figure 8:
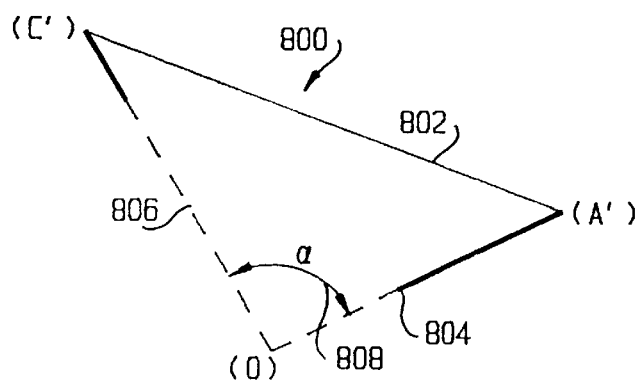
FIG. 8 is a phasor diagram illustrating a method for calculating the boost and/or buck required in each phase according to an exemplary embodiment of the present invention.

FIG. 7 shows how the disturbed input voltage of FIG. 6A can be restored to a balanced three phase set by the combined action of boosting and bucking, based on the exemplary embodiment.

In the ideal case, the turns ratio of each phase of the SSVR transformer would be infinitely variable. That is to say, there would be an unlimited number of very small taps so that any desired output voltage may be obtained. Although this is not a realistic assumption, it is convenient to start from this basis because it explains the concept of the SSVR as well as illustrating some of the practical limitations that must be addressed.

a) Assume that the output of the main transformer in the SSVR is connected as an ungrounded wye, as shown in FIG. 1. Prior to any disturbance, the SSVR would be operating with a turns ratio close to 1:1, so that the three P-N (phase to neutral) output voltages are essentially equal and in phase with the P-N input voltages.

b) When an up stream fault occurs, the input voltages are likely to become unbalanced in both magnitude and phase angle, as shown by the example of FIG. 7, where V(O-A) 704, V(O-B) 706, and V(O-C) 708 represent the phase-neutral (P-N) voltages at the input to the SSVR. However, if the three lines 704, 706, and 708 representing V(O-A), V(O-B), and V(O-C), respectively, are extended from the origin 702 along the direction of these three phasors, and if an equilateral triangle 710 is constructed whose sides represent the desired phase-phase output voltages; then the amount of boosting 712, 716 or bucking 714 may be determined for each phase by fitting the equilateral triangle 710 on the three radiating lines, such that each corner falls on one of the lines. The new secondary phase-neutral voltages are achieved by boosting or bucking the primary phase voltages, and are labeled V(O-A') 726, V(O'B') 728, and V(O-C') 730 in FIG. 7. Note that this example confirms that in order to produce a balanced set of L-L (line to line) output voltages, both boosting and bucking capability is required in the exemplary SSVR.

An exemplary method for determining the amount of boosting or bucking required in each phase by analytical means is shown in FIG. 8. Note that the equilateral triangle 710 (A'-B'-C') of FIG. 7, representing the L-L output voltages, is made up of three sub-triangles: O-A'-B' 720, O-B'-C' 722, and O-C'-A' 724. The top sub-triangle O-C'-A' 724 of FIG. 7 is shown in FIG. 8 as triangle 800.

The length of the "long side" 802 is known since that is the desired L-L voltage.

The orientation (but not the magnitude) of the other two sides 804, 806 of this sub-triangle are also known, since they have the same phase angles as the input voltages. Thus the angle 808 between them (α) is known.

The cosine law, shown as Eq. 1 can now relate the three sides of sub-triangle 800.

If $V_{(A')}$=O-A'=x; $V_{(C')}$=O-C'=z; $V_{(C'-A')}=V_{(LL)}$; α=Angle between O-A' and O-C';

$$V_{(LL)}^2 = x^2 + z^2 - 2xz\,\text{Cos}(\alpha)$$

or, $$0 = x^2 - x(2z\,\text{Cos}(\alpha)) + (z^2 - V_{(LL)}^2) \qquad \text{Eq. 1}$$

Similarly, for the other sub-triangles 720, 722:

$$0 = y^2 - y(2x\,\text{Cos}(\beta)) + (x^2 - V_{(LL)}^2), \qquad \text{Eq. 2}$$

where β=Angle between O-A' and O-B';

$$0 = z^2 - z(2y\,\text{Cos}(\chi)) + (y^2 - V_{(LL)}^2), \qquad \text{Eq. 3}$$

where χ=Angle between O-B' and O-C';

Since there are three such sub-triangles (720, 722, 724, shown in FIG. 7), there is enough information to solve for all three secondary phase-neutral voltages. Therefore, from that information, one is able to determine the amount of boost or buck needed for each phase.

Figure 9A:
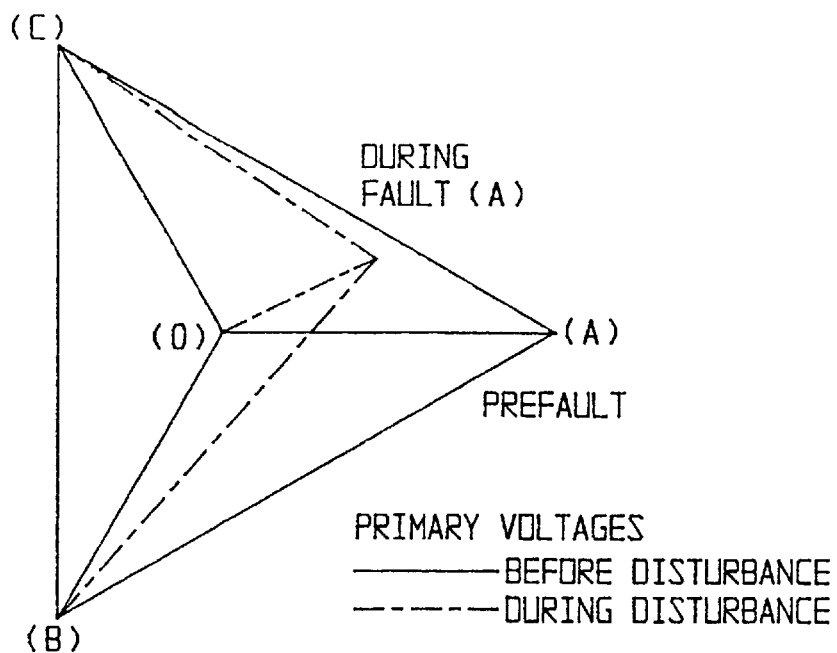
FIGS. 9A–9B are phasor diagrams illustrating how the use of a separate grounding transformer produces a fully balanced set of three phase voltages.
Figure 9B:
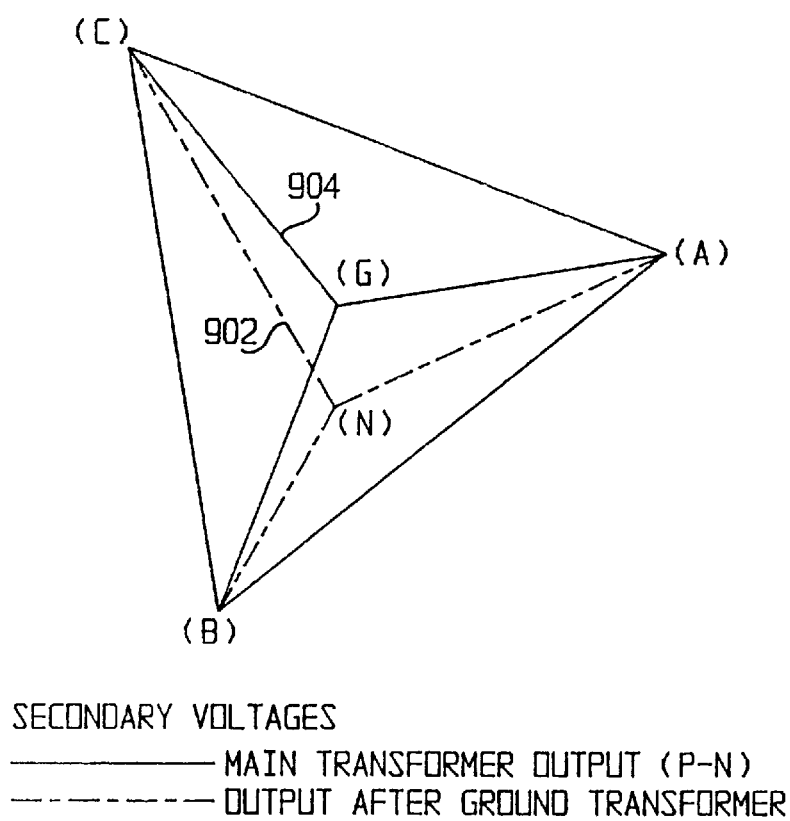

FIGS. 9A–9B show that the phase-neutral voltages at the output of the main SSVR transformer are neither equal in magnitude nor evenly spaced; but that the use of a separate grounding transformer does produce a fully balanced set of three phase voltages, both on a phase-neutral and a phase-phase basis. In FIG. 9B, lines 902 represent the output of the transformer without the use of a separate grounding transformer, and lines 904 represent the output of the transformer when a separate grounding transformer is used.

As shown in FIG. 9B, the secondary phase-neutral voltages, that is the voltage between each phase and the star-point of the secondary windings, will not be equal and will not be equally spaced. Therefore, if the star-point is connected to ground, so as to make a grounded secondary system, its phase to ground voltages would be unequal and unbalanced. If the star-point is allowed to float and the ground for the SSVR output established via a separate grounding transformer (as shown in FIG. 1), however, then each phase to ground output voltage will be equal in magnitude and evenly spaced as shown by lines 904 in FIG. 9B.

Referring to FIG. 9A, even though the SSVR output voltages have been corrected to about 1.0 pu (per unit) in magnitude and the phase angles are balanced, the entire phasor set is likely to exhibit a slight phase shift with respect to the pre-fault voltages.

FIGS. 10A–10C show the arrangement and phasor diagrams for a wye to zigzag connected transformer 1000 for the case where the input voltages are equal and balanced. The zigzag transformer 1000 is a well known connection, and the purpose of FIGS. 10A–10C is to provide a starting point for understanding FIGS. 11A–11C that follow. In FIG. 10A, the zigzag secondary is shown as reference 1002 and the wye primary is shown as reference 1004.

FIG. 10B are three phasor diagrams of transformer 1000. FIG. 10B follows the usual conventions for power transformers, which assumes that the voltages across all windings on the same core leg (1018 shown in FIG. 10C) are in phase so that their phasors are drawn in parallel. For example, Phase A of primary winding 1011 and the two sections of the split secondary winding 1012 and 1013 are all on the same core leg, so their phasors in FIG. 10B are all drawn in parallel 1014, 1015, 1016. Similarly, Phase B and Phase C follow the same pattern except rotated to form the three-phase set. When the secondary windings are connected as shown in Fig, 10A, the phasor diagram shown in the middle of FIG. 10B results; and when the voltages at the output terminals of FIG. 10A (A', B', C', 0) are constructed, the right diagram of Fig, 10B results. FIG. 10C is a pictorial view of an exemplary winding arrangement of secondary 1002, the primary winding being omitted in FIG. 10C for clarity.

Figure 11A:
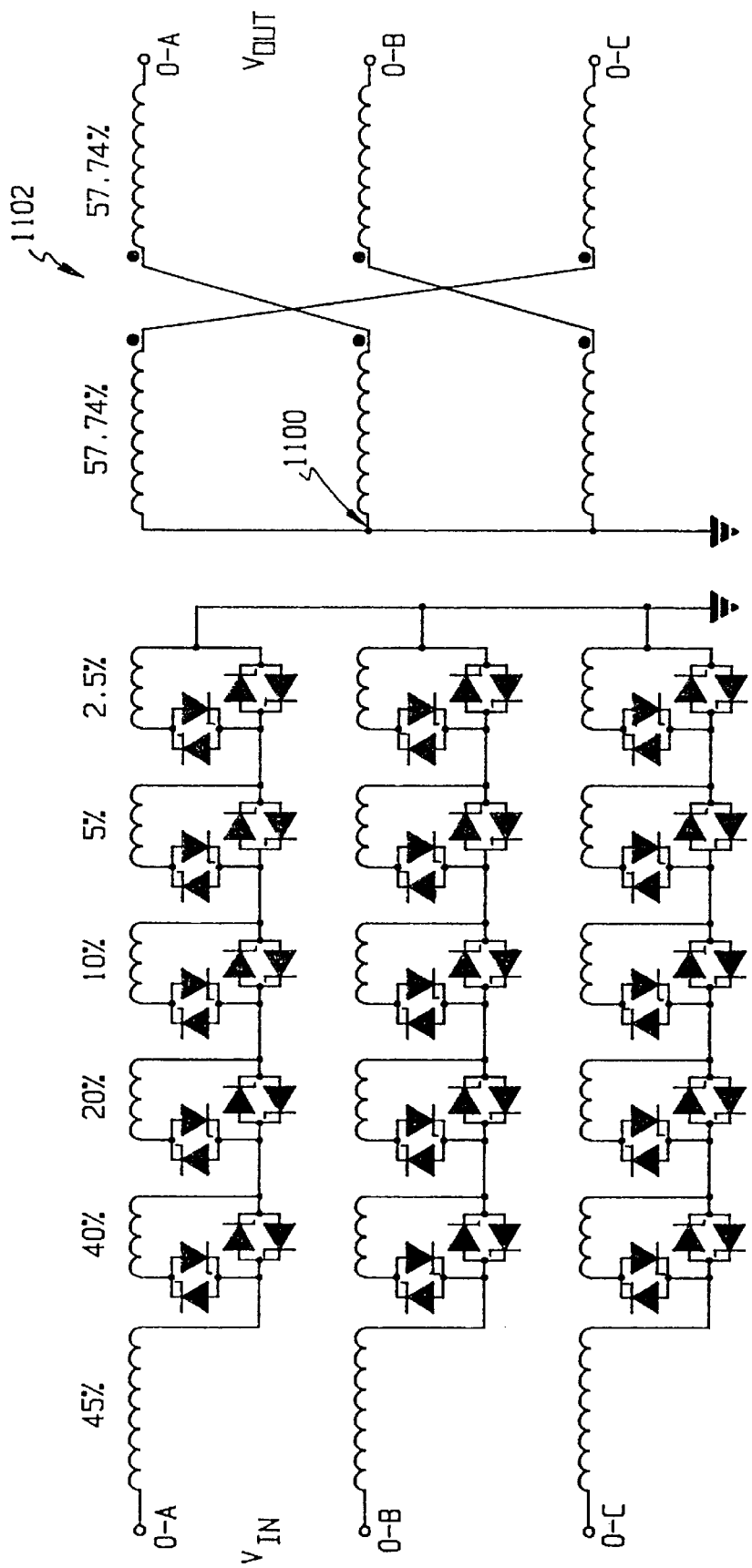
FIGS. 11A–11C illustrate how the wye to zig-zag transformer of FIGS. 10A–10C is applied to the SSVR according to an exemplary embodiment of the present invention.
Figure 11B:
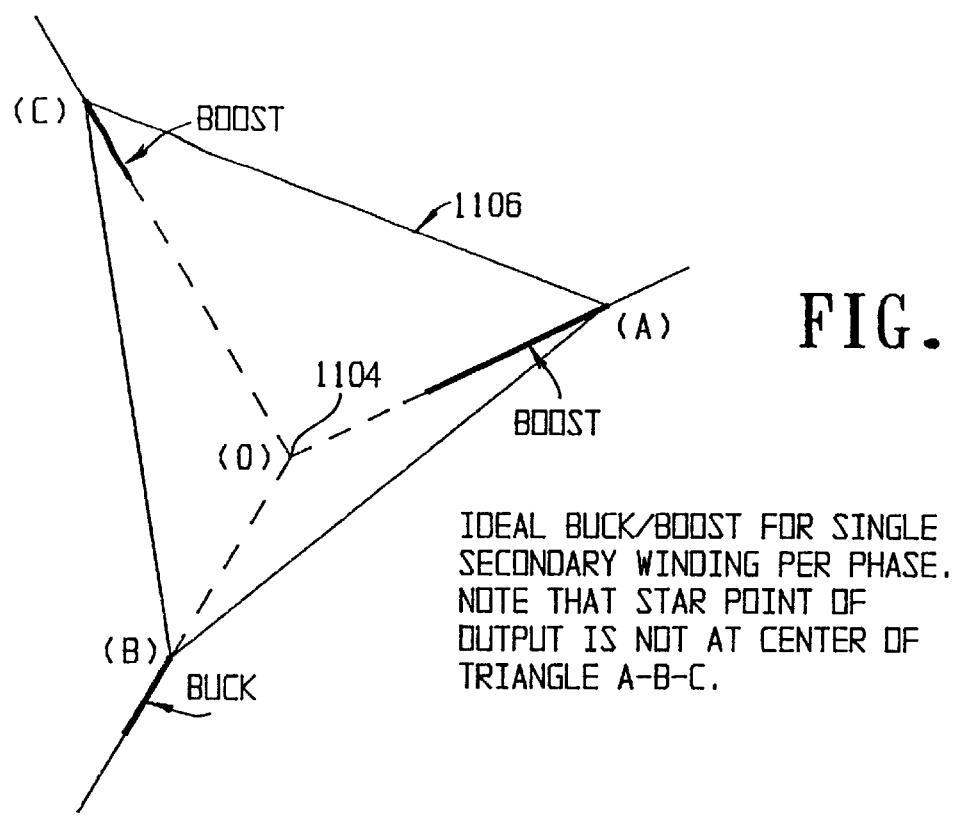
Figure 11C:
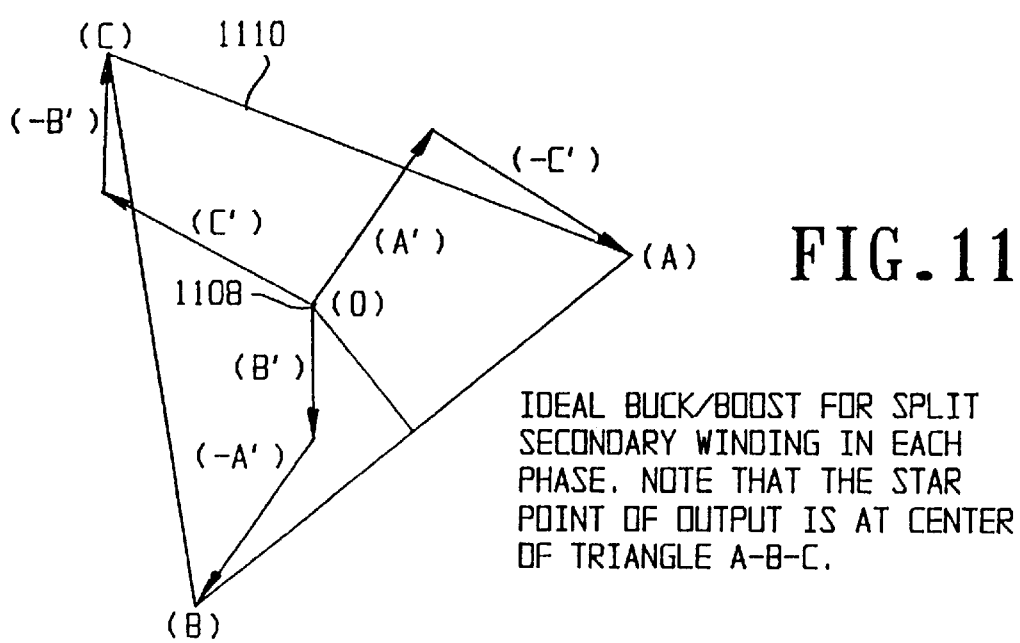

FIG. 11A shows how the wye to zigzag transformer 1000 of FIG. 10 is applied to the SSVR. In this case, the unequal and unbalanced voltages of FIG. 6A are applied to the input of the SSVR. FIG. 11B illustrates how the output voltages may appear, if the secondary windings are a simple wye, that is without a zigzag. On the other hand, FIG. 11C shows how the output voltages are combined in a zigzag winding to produce balanced line-line voltages as well as balanced line-neutral voltages with the star point 1108 at the center of the zigzag phasors 1109. Since the star point 1109 is at the center of triangle A-B-C, it can be connected to ground and still produce the balanced set of line-line phasors and a balanced set of line-neutral phasors, so that a separate grounding transformer is not required.

The example presented above for the ideal case used a complex number representation of the various voltages (i.e., phasors) and was based on the assumed ability of the thyristors to change taps as required. In addition, it was assumed that there were an unlimited number of tap steps and tap ranges. These assumptions, while convent for illustration, are not required for the exemplary SSVR for the following reasons:

a) The use of a phasor representation for the voltages is not fundamental to the SSVR because phasors imply a steady state condition which is not true during disturbances. Other control means, such as linear or non-linear transforms, may be used to determine the amount of gain (boost of buck) that should be applied to each input phase of the SSVR.

b) Since thyristors are the most cost-effective static switching devices now available, a preferred embodiment for the SSVR is based on these devices. Tap changing in the SSVR, however, involves either inserting a transformer winding (such as 108) or bypassing it. From the diagram of FIG. 1 it is evident that unless one switching element 110 (shown in FIG. 1 as a pair of thyristors) is off (blocking) before the other switching element 111 is allowed to conduct current, the transformer winding will be short-circuited. Since thyristors require the current be reduced to zero before they will turn off and block reapplied voltage, a preferred method of avoiding such shot circuits is to allow tap changing only when the current is at a natural zero. In practice, this may slow the operation of the SSVR by as much as a half cycle. Alternatively, there are other methods for avoiding the potential for short circuits during tap changing:

In some cases, the voltages present in the circuit are such that turning on one switching element may produce a current which will drive the current out in the opposite switching element, resulting in an immediate forced commutation.

The choice of thyristors as the switching devices of the SSVR is only one of several classes of static devices that can be used. Other devices, such as gate turn-off (GTO) devices, may be used in the SSVR permitting immediate tap changing regardless of current flow through the device. Thus, it is not necessary for the current to be reduced to zero before a tap change could be ordered.

c) Since an actual SSVR cannot practically have an unlimited range and an unlimited number of taps, some compromise with ideal performance must be accepted. It is contemplated that such compromises are:

Limiting the tap range which, in turn, limits the severity of faults that can be corrected.

Limiting the number of tap steps which, in turn, results in coarse control of the output voltage.

These design parameters that may be adjusted as desired to fit a particular application.

Even though most utility system disturbances affect only one phase, multi-phase disturbances occur as well. Moreover, multi-phase disturbances tend to have different characteristics than single phase disturbances. In a line-to-line fault, for example, the voltage of the two faulted phases will be phase shifted toward each other down stream of the fault. The phasor diagram of FIGS. 12A shows this effect.

Figure 12A:
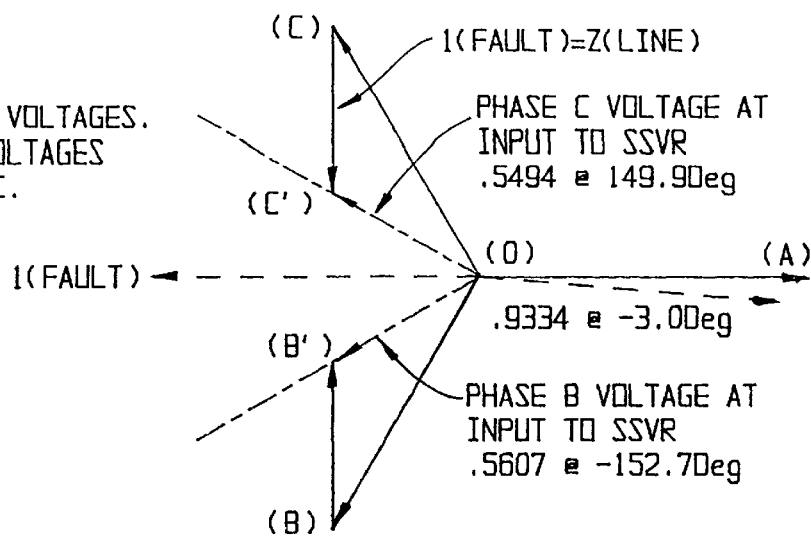
FIGS. 12A–12C are phasor diagrams illustrating a severe phase to phase disturbance.

In FIG. 12A, the voltages are represented as follows:

O-A, O-B, O-C=Phase-to-Neutral voltages at the source.

B-B', C-C'=Line drop from source to common bus in Phase B, C, respectively, during the fault.

O-B', O-C'=Phase B and C voltage at the input to the SSVR (shown as dotted lines).

Figure 12B:
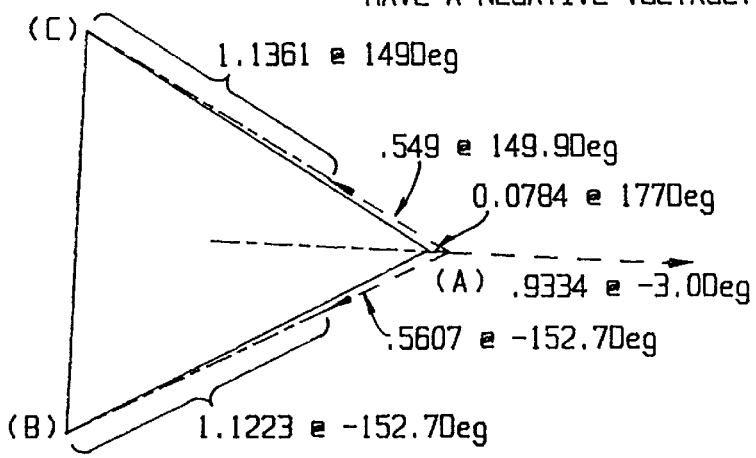
Figure 12C:
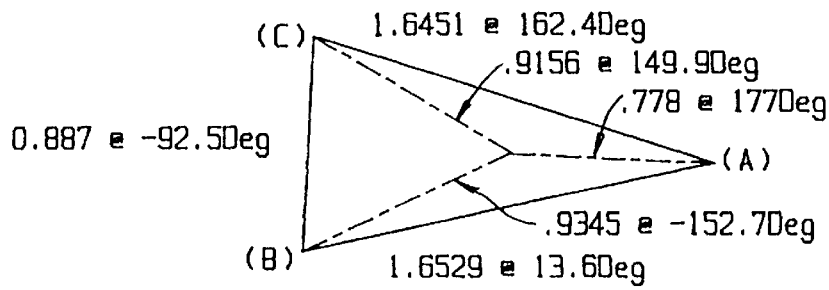

Note that the phase angle between OB' and OC' has been reduced from 120° at the source to less than 60° at the SSVR. As a result, it is not possible to locate an equilateral triangle on the three lines representing the angles of the phase voltages, as was done for the L-G fault described above, because the required length for Phase A becomes negative. See FIG. 12B. In effect, this L-L fault is too severe for the SSVR to handle. The severity of the fault of FIG. 12A, causes the voltage on Phase B-C to sag to about 30% of its pre-fault value.

Figure 13A:
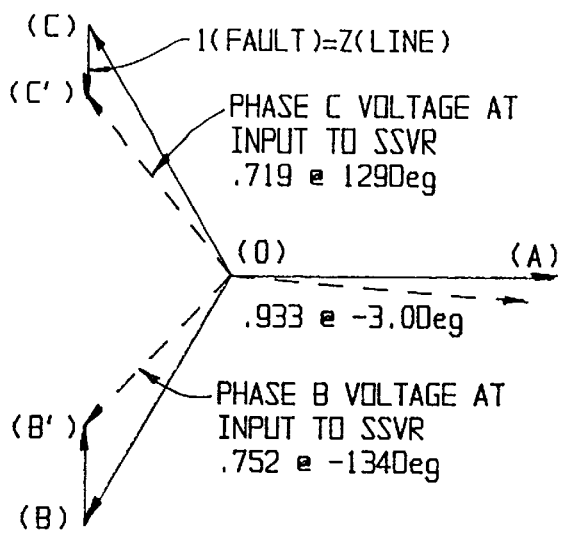
FIGS. 13A–13C are phasor diagrams illustrating a less severe phase to phase disturbance.
Figure 13B:
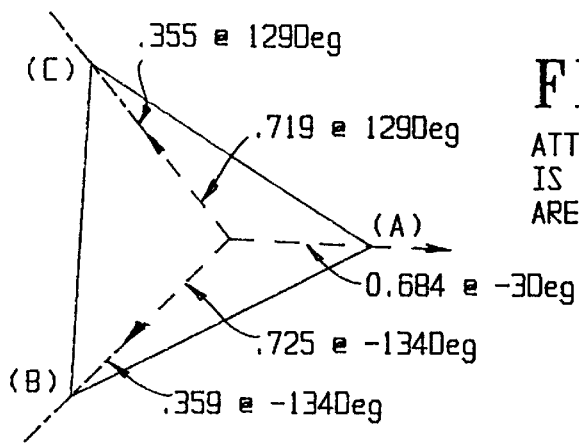
Figure 13C:
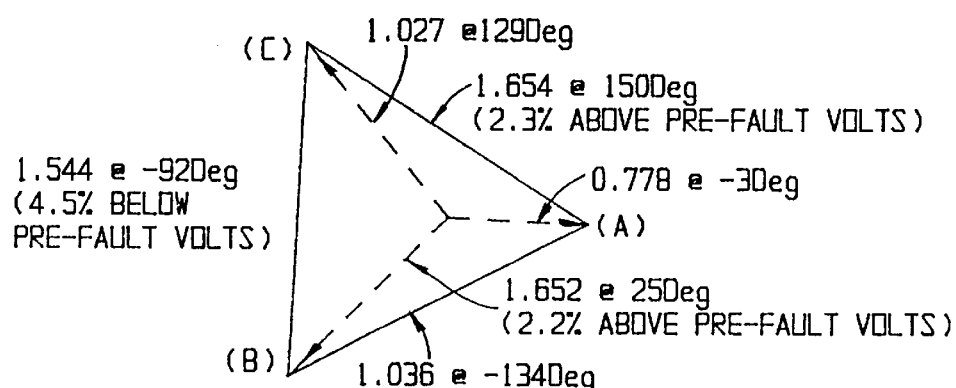

A less severe fault is shown in FIGS. 13A–13C. In this example, the sag on the Phase B-C voltage is only down to about 70% of normal, and the phase shift in Phases B and C is much less as well. Consequently, a solution can be found that restores a balanced set of output voltages.

While the upstream disturbance is in progress, the effective turns ratio of the SSVR transformer has been changed from its normal value of about 1:1 to perhaps as much as 1:2. Thus, when the disturbance ends and the input voltage returns to full value, the output voltage may increase dramatically until the SSVR control can sense the over-voltage and readjust the tap setting. The extent of the over-voltage can be controlled by the addition of surge arrestors (112, etc. shown in FIGS. 1–5). These surge arrestors may be Zinc Oxide arrestors, for example.

Referring again to FIG. 1, a preferred location for arrestor 112 is across the fixed primary winding 106 of SSRV 100, where the arrestor voltage will normally be only about half of the phase-neutral voltage at the input; but where the arrestor is voltage will be 1.0 pu immediately after a recovery from a voltage sag. This allows the application of an arrestor having a maximum continuous operating voltage (mcov) rating that is about half the mcov of the input system voltage. This effectively limits the crest of the output voltage when the input voltage suddenly returns to normal.

Another preferred location for arrestor 112 is at the secondary 114 of the SSVR 100. In this manner, the impedance of the transformer will assist in reducing the over-voltage. In this case, the mcov of the arrester must be set according to the voltage of the secondary system.

Although the above discussion regarding arrestors 112 is directed to the SSVR 100 of FIG. 1, the invention is not so limited as arrestors 112 may be used in any of the exemplary embodiments discussed above.

Figure 14:
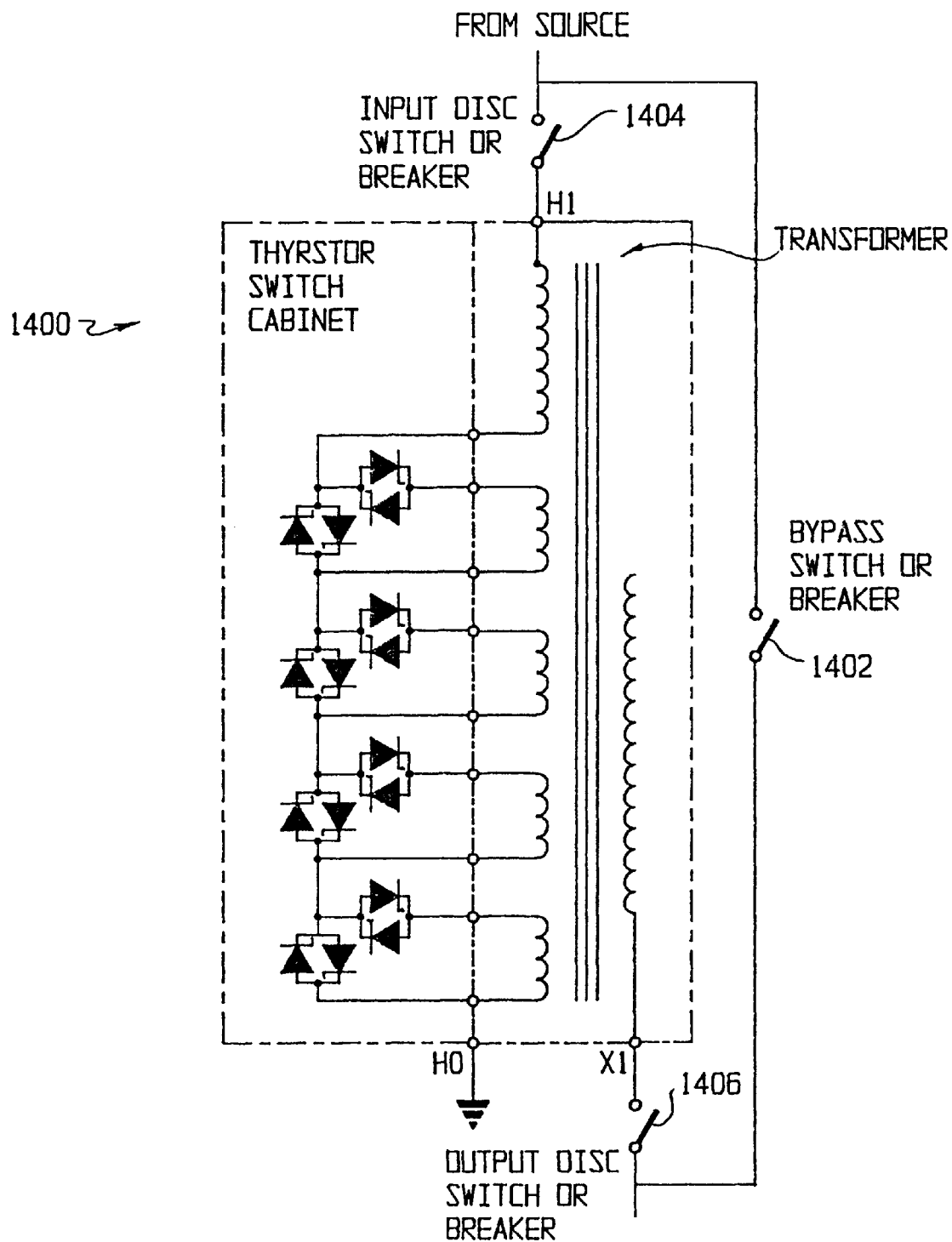
FIG. 14 is a system to facilitate the startup or shutdown of the SSVR without disturbing the load.

Although the SSVR can be realized with a number of different transformer and tap switching configurations (some of which are shown in the FIGS. 1–5), there is an advantage if a transformer configuration is chosen which has zero (or near zero) phase shift between the primary and secondary. In this case, the addition of a bypass circuit breaker or switch 1402 as shown in the Single Line Diagram of FIG. 14 will permit the SSVR to be placed in service or removed from service without interrupting the load. Such transformer configurations include wye-wye, delta-delta, and delta-zigzag. In FIG. 14, to insert SSVR 1400 between the source (not shown) and the load (not shown), input disconnect switch 1404 and output disconnect switch 1406 must be closed before bypass switch 1402 is opened. Likewise, to remove SSVR 1400 form the circuit, bypass switch 1402 is closed before input disconnect switch 1404 and output disconnect switch 1406 are opened.

Figure 15:
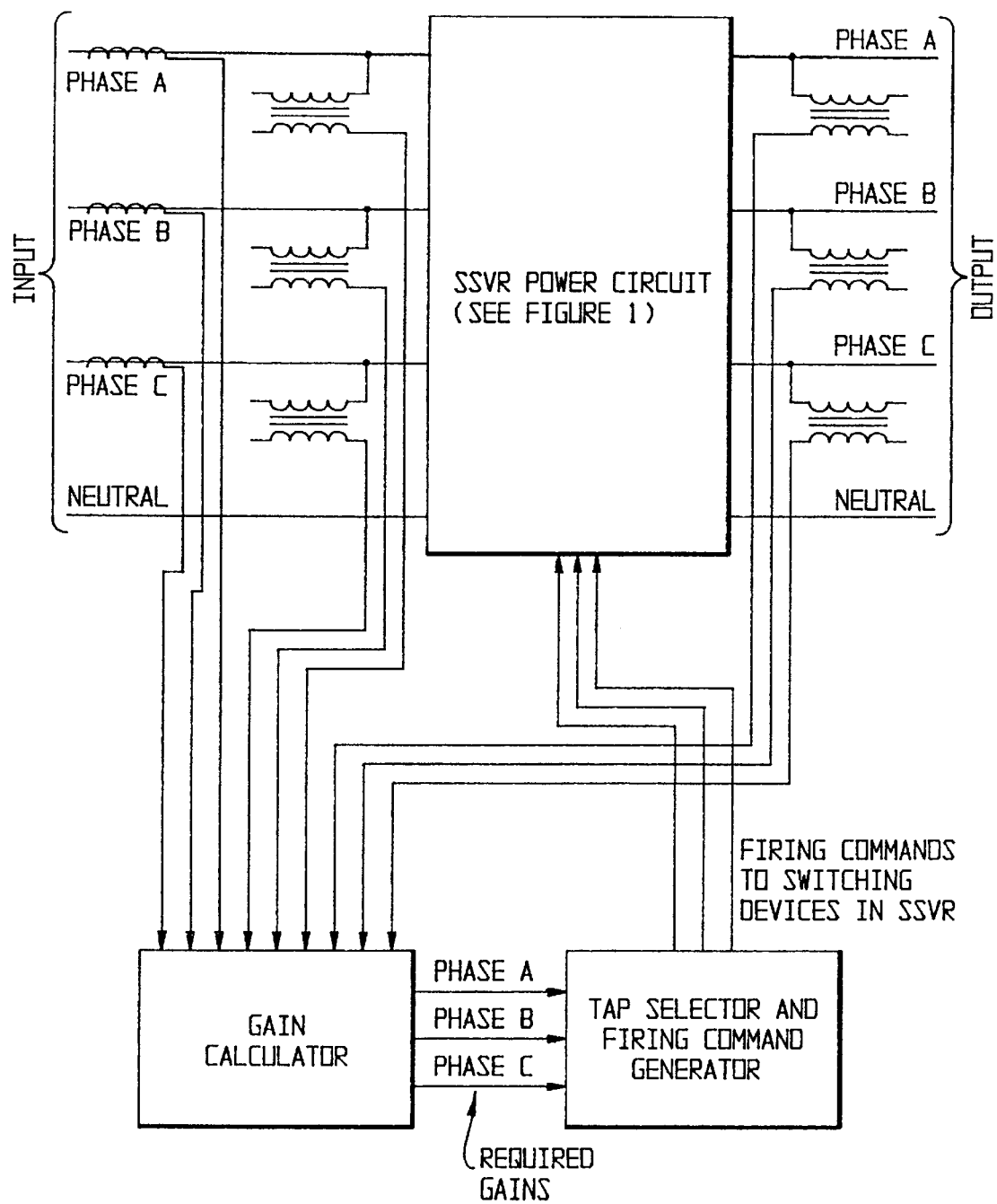
FIG. 15 is a block diagram of an SSVR system according an exemplary embodiment of the present invention.

FIG. 15 is a block diagram of an exemplary SSVR system 1500. In FIG. 15, SSVR power circuit 1502 is similar to the configurations shown in FIGS. 1–5, previously described. Control of the tapping sequence is accomplished using input current transformers 1504, input potential transformers 1506, output potential transformers 1508, processor 1510 and tap selector 1512. Current transformers 1504 and potential transformers 1506, 1508 are conventional well-known devices and are therefore not described in detail herein.

Processor 1510 samples the voltage and current input to SSVR 1502 and the voltage output from SSVR 1502. In response to these inputs, processor 1510 determines the gains required to adjust for input disturbances and provides those gains as signals 1514 to selector 1512. In turn, tap selector 1512 generates signals 1516 to control the switching elements (shown in FIGS. 1–5).

As indicated previously, the two sets of switches (110 and 111 for example) connected to a given transformer winding must not be permitted to conduct at the same time, otherwise a short circuit of that winding occurs. (A momentary short circuit of this type may self-clear, if the circuit conditions are such so as to provide sufficient commuting current. In general, however, these conditions cannot be relied on). On the other hand, either the bypass set of switches or the insert set of switches need to be in conduction, otherwise the transformer will be open circuited. (There is a short interval when the switch current passes through zero when neither switch is in actual conduction, but this is of no practical consequence.) Therefore, in an exemplary embodiment of the present invention:

a) The control will produce a firing order for each transformer winding that calls for either the "insert" or "bypass" switches to be conducting. The firing order will be in one state or the other at all times.

b) Both sets of switches ("insert" and "bypass") are monitored for non-conduction by the presence of voltage across them or by the absence of current through them. Unless a switch is confirmed to be non-conducting, a signal is generated which blocks any firing of the opposite set of switches.

Therefore, every firing command requires two conditions: a firing order produced by the control in response to system conditions plus an enable (non-block) signal indicating that the opposite set of switches are not conducting. In this exemplary embodiment, changes in firing orders from the control will be implemented in the solid state switches the next time the current for the respective phase goes through zero.

Figure 16:
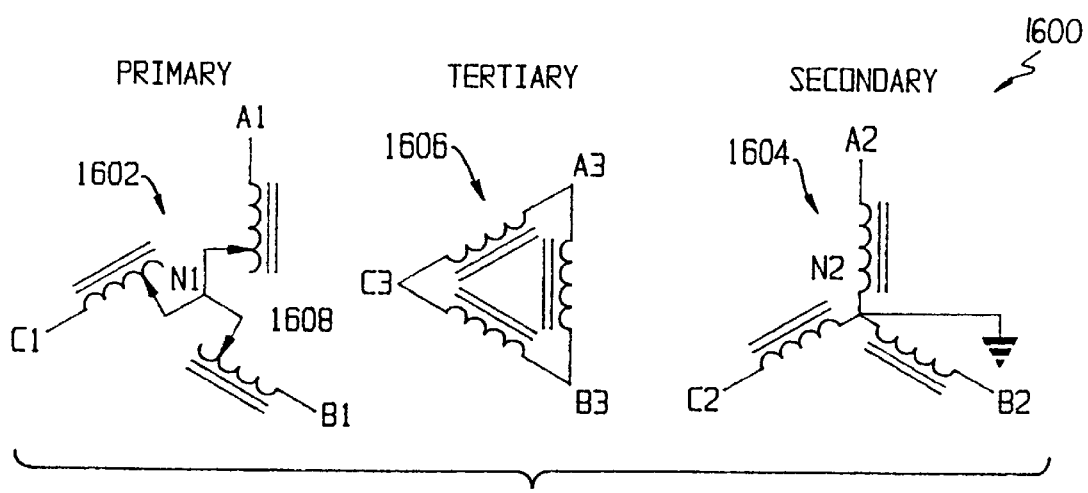
FIG. 16 is a schematic diagram of a sixth exemplary embodiment of the present invention.

FIG. 16 illustrates a sixth exemplary embodiment of the present invention. In FIG. 16, SSVR transformer 1600 is a three winding transformer, that is, consisting of primary, secondary, and tertiary windings. In the exemplary embodiment, the primary winding 1602 and secondary 1604 winding are star (wye) connected while the tertiary winding 1606 is delta connected.

Similar to the first through fifth exemplary embodiments, voltage regulation is performed using static switches 1608 located adjacent the star point of the primary windings 1602. The detail of the switch arrangement for each primary winding is shown in FIG. 1 and described in the associated text above. Since the tapping is performed on the primary windings, only the primary has an adjustable tap range, and the secondary and tertiary each have a fixed number of turns. The tap orders are defined as:

$$g_A = n_{1A}/n_2;\ g_B = n_{1B}/n_2;\ g_C = n_{1C}/n_2$$

Figure 17:
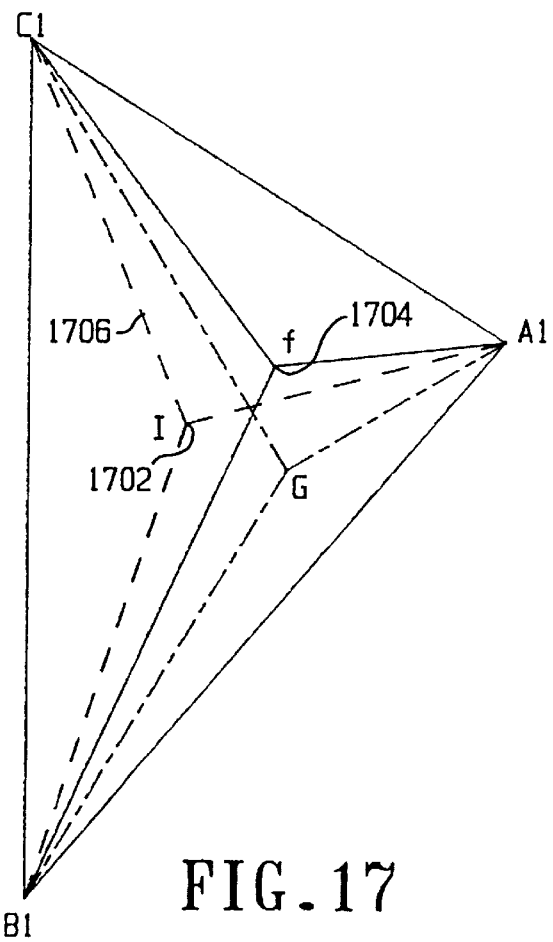
FIGS. 17–19 are phasor diagrams of the exemplary embodiment of FIG. 16.

FIG. 17 illustrates a phasor diagram where an arbitrary set of line voltages is applied to the primary windings 1602. In FIG. 17, primary ground G is merely illustrative and is not provided. The line voltages $V_{A1B1}$, $V_{B1C1}$ and $V_{C1A1}$ may have any arbitrary asymmetrical form. Point 1702 shows the change in the phasor diagram based on a first tapping, and point 1704 illustrates the final star common point.

Since no connection is provided to the primary star common point, the primary line voltages alone do not determine the voltage across each winding. The following two equations, however, relate the primary side winding voltages to the line voltages and are valid both in time and frequency domain.

$$V_{A1N1} - V_{B1N1} = V_{A1B1}$$

$$V_{B1N1} - V_{C1N1} = V_{B1C1} \qquad \text{Eq. 4}$$

The tertiary windings 1606 comprise a closed circuit, and, thus, the sum of the voltages across this circuit adds up to zero.

$$V_{A3B3} + V_{B3C3} + V_{C3A3} = 0 \qquad \text{Eq. 5}$$

Using the fact that the secondary and tertiary have fixed turns ratios, one can derive:

$$\frac{V_{A3B3}}{V_{A2N2}} = \frac{V_{B3C3}}{V_{B2N2}} = \frac{V_{C3A3}}{V_{C2N2}} \qquad \text{Eq. 6}$$

Substituting EQ 5 in EQ 6, yields:

$$V_{A2N2} + V_{B2N2} + V_{C2N2} = 0 \qquad \text{Eq. 7}$$

Eq. 7, which is both applicable in time and frequency domain, sets a constraint on the secondary phase voltages that mathematically implies that point N2 (shown in FIG. 16) is always set to the Center Of Gravity (COG) of the voltage triangle formed by A2, B2 and C2.

Consider the primary line voltage shown in FIG. 17. Assuming a unity tapping order, (i.e. $g_A=1$, $g_B=1$, $g_C=1$), the sum of the phase voltages on the primary side would also add up to zero:

$$V_{A1N1}+V_{B1N1}+V_{C1N1}=0 \qquad \text{Eq. 8}$$

The Eq. 8 and Eq. 4 are necessary to uniquely derive the primary phase winding voltages. Once these voltages are derived, the secondary voltages can be easily obtained. Solving the equations, determining all the voltages, the primary voltage phasor diagram is shown in FIG. 17 as dotted lines 1706, and the secondary voltage phasor diagram is shown in FIG. 18 as dotted lines 1806.

Figure 18:
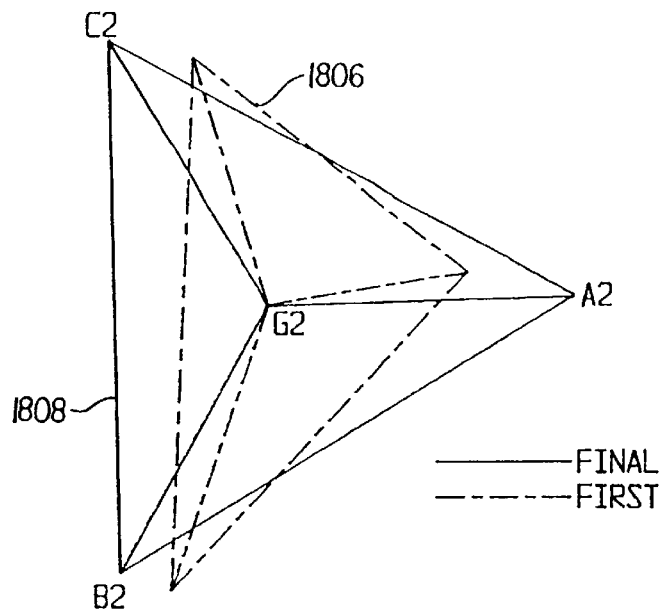
Figure 19A:
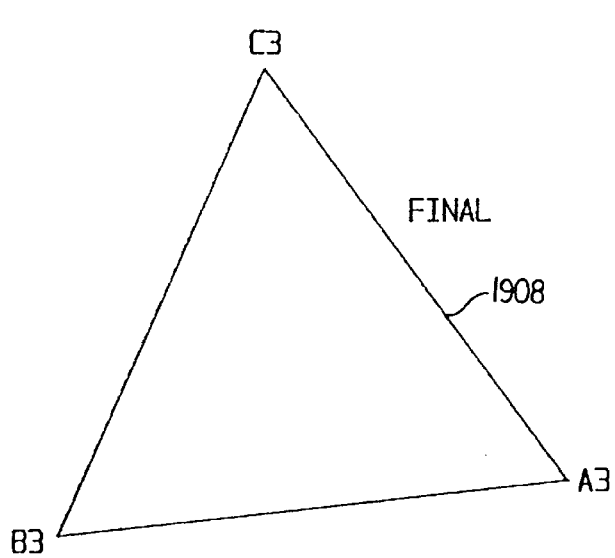
Figure 19B:
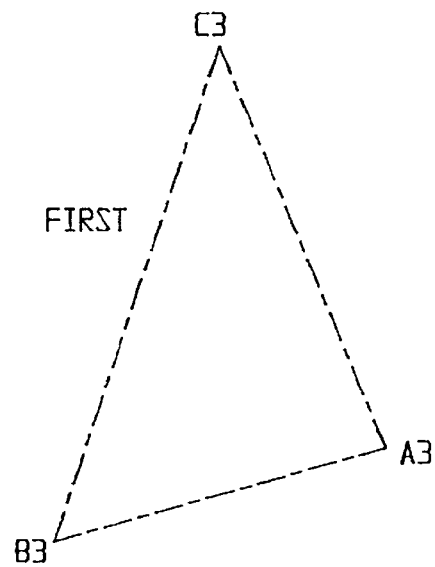

As shown in FIG. 18, the secondary voltages are not symmetrical. The sum of the tertiary voltages, however, is zero as shown in FIG. 19B. Note the fact that the zero sum of the tertiary voltages implies a zero sum of the secondary phase voltages. FIG. 19B illustrates the phasor diagram of the tertiary voltage after the primary tappings are completed.

In order to get symmetrical voltages at the secondary, the phase voltages should have an equal magnitude of 1 p.u., but as shown in FIG. 18, the secondary phase voltages have magnitudes different from one another.

Measuring primary phase voltages, or equivalently solving Eq. 4 and Eq. 8, the primary phase magnitudes are $|V_{A1N1}|$, $|V_{B1N1}|$ and $|V_{C1N1}|$. Setting the primary tapings as:

$$g_A=|V_{A1N1}| \; g_B=|V_{B1N1}| \; g_C=|V_{C1N1}| \qquad \text{Eq. 9}$$

adjusts the secondary phase voltages toward 1 p.u. Applying the same principle used to derive Eq. 5, but considering non-unity tapping orders, the general form of Eq 8 is obtained as:

$$\frac{V_{A1N1}}{g_A}+\frac{V_{B1N1}}{g_B}+\frac{V_{C1N1}}{g_C}=0 \qquad \text{Eq. 10}$$

Using new the tapping order derived from voltage measurements as described in Eq. 10, and solving the general system of Eq 4 and Eq 10, the new primary winding voltages can be obtained.

Continuing this process iteratively (deriving the primary voltage and reset tapping orders), ultimately results in a set of three equal and symmetrical secondary voltages with 120° phase displacement. The final secondary and tertiary voltages are shown in FIG. 18 as 1808 and in FIG. 19A as 1908.

The subtle point regarding the primary star-common-point is that it finally resides at a point (point 1704 FIG. 17), which is different from the primary ground (G) and COG of the triangle made by the primary line voltages (point 1702 of FIG. 17).

The basis of the whole scheme lies in the fact that, assuming enough tapping is carried out on the primary, such that the secondary phase voltages have 1 p.u. magnitude and noting the fact that N2 is the COG of the secondary triangle, the secondary phase voltages will have a 120° phase displacement, resulting in a balanced set of voltages.

Considering the fact that the sum of secondary winding voltages add up to zero, the zero sequence component of the secondary side phase voltages is zero. In other words, the star/delta (i.e. secondary/tertiary) transformer connection can be considered as a ground transformer for the load, because the closed delta provides a path for zero sequence current from secondary to ground.

Figure 20:
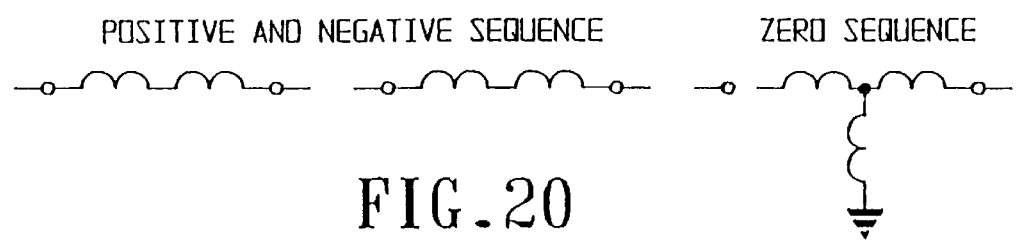
FIG. 20 is a diagram of the sequence networks for the exemplary embodiment of FIG. 16.

The sequence impedance of the transformer of FIG. 17 is shown in FIG. 20 and is derived from well known symmetric component transformations. The secondary is connected to the primary circuit in both positive and negative sequence equivalent circuits, while the secondary is connected to the tertiary and grounded in the zero sequence circuit and the primary is isolated. Thus, the secondary provides a grounded system isolated from the primary set of voltages.

The primary side equations that are used in the control scheme are shown as Eq. 11:

$$V_{AN}-V_{BN}=V_{AB} \qquad \text{Eq. 11}$$
$$V_{BN}-V_{CN}=V_{BC}$$
$$\frac{V_{AN}}{g_A}+\frac{V_{BN}}{g_B}+\frac{V_{CN}}{g_C}=0$$

Where $g_A$, $g_B$, and $g_C$ are the tapings applied to each primary phase winding.

Using Eq. 12, the primary winding voltages are derived as:

$$\begin{pmatrix}V_{AN}\\V_{BN}\\V_{CN}\end{pmatrix}=\frac{1}{(g_Ag_B+g_Bg_C+g_Ag_C)} \qquad \text{Eq. 12}$$
$$\begin{bmatrix}g_A(g_B+g_C) & g_Ag_B\\-g_Bg_C & g_Ag_B\\-g_Bg_C & -g_C(g_A+g_B)\end{bmatrix}\begin{pmatrix}V_{AB}\\V_{BC}\end{pmatrix}$$

The above transformation is applicable in both the time and frequency domains.

Figure 21:
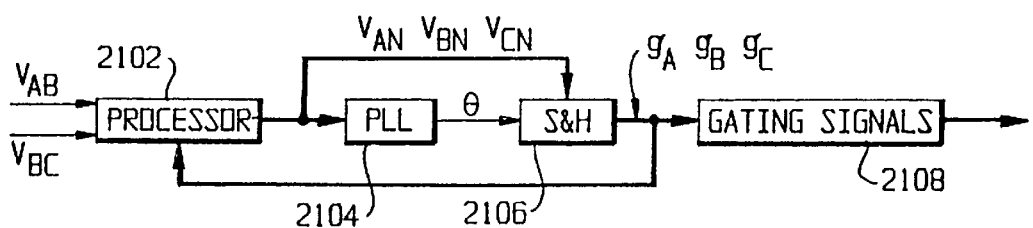
FIG. 21 a control circuit according to the sixth exemplary embodiment of the present invention.

An exemplary control circuit based on the Eqs. 8 and 9 is shown in FIG. 21. In FIG. 21, two line voltages $V_{AB}$ and $V_{BC}$ are the inputs to processor 2102. Processor 2102 derives the line to neutral voltages $V_{AN}$, $V_{BN}$, $V_{CN}$ following Eq. 12 using the previous setting of the gains $g_A$, $g_B$, $g_C$ and the two line voltages. Processor 2102 is connected to Phase Lock Loop (PLL) 2104, which derives phase angle θ based on the three line-neutral voltages. Phase θ is input to Sample & Hold (S&H) 2106 along with the three line-neutral voltages. S&H 2106 produces gain signals $g_A$, $g_B$, $g_C$, which are normalized line-neutral voltages sampled at least twice per cycle for each phase, and held constant between sampling instants. The output of S&H 2106 is provided to Gate Signal block 2108. In the exemplary embodiment, Gate Signal block 2108 derives tap combinations that provide the values closest to the gains $g_A$, $g_B$, $g_C$ independently for each phase.

As mentioned above, tapings are derived by measuring the magnitude of the line to neutral voltages. Since magnitude is a phasor related quantity, line to neutral voltages are sampled at their peak values (i.e., tapings are updated six times a cycle). The derived values for tapings are then used in Eq. 12, iteratively. The gate order for each winding is later derived from the tapping orders.

This exemplary embodiment provides the following benefits:

Closed delta tertiary provides a flux balancing mechanism for the transformer

No ground transformer necessary

Simple feed-forward control

Closed delta tertiary provides a 120° phase shift between the secondary winding voltages. Thus, the controllers main task is to derive 1 p.u. voltages on the secondary windings.

The secondary line to neutral voltages are zero sequence free.

For unbalanced loads, this scheme results in sinusoidal currents in the switching elements.

Although the invention has been described with reference to exemplary embodiments, it is not limited thereto. It is intended to be and understood that the following appended claims should be construed to include other variants and embodiments of the invention which may be made by those skilled in the art as being within the true spirit and scope of the present invention.

What is claimed:

1. A voltage regulator for use with a power source, the regulator comprising:
   a transformer having:
      a primary winding and a secondary winding,
      a plurality of further windings selectively connected to one of the primary winding and the secondary winding, and
      a plurality of solid state selectors, each of the plurality of solid state selectors respectively coupled to each of the plurality of further windings and selectively connecting and bypassing the respective further windings in series with one of the primary winding and the secondary winding.

2. The apparatus according to claim 1, wherein the plurality of selectors are solid state switches.

3. The apparatus according to claim 2, wherein the solid state switches are at least one of thyristors and gate turn-off thyristors.

4. The apparatus according to claim 1, further comprising a further transformer coupled between an output of the transformer and a reference.

5. The apparatus according to claim 4, wherein the reference is a ground potential.

6. The apparatus according to claim 1, further comprising a voltage limiter coupled to at least one of the primary winding and the secondary winding.

7. The apparatus according to claim 6, wherein the voltage limiter is a surge suppressor.

8. The apparatus according to claim 1, wherein the primary winding and the secondary winding are a respective plurality of windings.

9. The apparatus according to claim 8, wherein the plurality of primary windings have one of a delta configuration and a wye configuration.

10. The apparatus according to claim 9, wherein the plurality of secondary windings have one of i) a delta configuration, ii) a wye configuration and iii) a zig-zag configuration.

11. The apparatus according to claim 1, wherein the plurality of further windings are five windings having a turns ratio of 40%, 20%, 10%, 5, and 2.5%, respectively.

12. The apparatus according to claim 11, wherein the plurality of further windings are coupled to the primary winding, the primary winding having a turns ratio of 45% and the secondary winding having a turns ratio of 100%.

13. The apparatus according to claim 11, wherein the plurality of further windings are coupled to the secondary winding, the secondary winding having a turns ratio of 45%, and the primary winding having a turns ratio of 100%.

14. The apparatus according to claim 1, further comprising:
   a current transformer coupled to an input of the transformer for determining an input current;
   a first potential transformer coupled to the input of the transformer for determining an input voltage;
   a second potential transformer coupled to an output of the transformer for determining an output voltage;
   a processor coupled to respective outputs of the current transformer, first potential transformer, and second potential transformer, the processor generating a gain signal based on the input current, input voltage and output voltage;
   a controller coupled to the processor and the plurality of selectors, the controller generating a plurality of control signals to control the plurality of selectors based on the gain signal.

15. The apparatus according to claim 14, wherein the plurality of control signals selectively connects or bypasses each of the plurality of further windings.

16. The apparatus according to claim 14, wherein the controller selectively generates a further plurality of control signal based on a conduction state of the plurality of selectors.

17. The voltage regulator of claim 1, wherein said voltage regulator adjusts an output voltage in response to a change in an input voltage received from the power source.

18. A voltage regulator for use with a power source, the regulator comprising: a transformer having
   a plurality of primary windings and a respective plurality of secondary windings;
   a plurality of further windings, the plurality of further windings selectively connected to each of the plurality of primary windings, and
   a plurality of first selectors and a plurality of second selectors, an output of the first selector coupled to an input of a respective one of the plurality of further windings and an output of the second selector coupled to an output of the respective one of the secondary windings, said first and second selectors selectively connecting and bypassing the respective further winding in series with the primary winding such that when one of the plurality of first selectors is enabled, the respective one of the plurality of further windings is connected in series with a respective one of the primary windings, and when one of the plurality of second selectors is enabled, the respective one of the plurality of further windings is bypassed.

19. The voltage regulator of claim 18, wherein said voltage regulator adjusts an output voltage in response to a change in an input voltage received from the power source.

20. The voltage regulator of claim 18, wherein said transformer adjusts an output voltage in response to a change in an input voltage received from the power source.

21. A voltage regulator for use with a power source, the regulator comprising: a transformer having:
   a primary winding, a secondary winding, and a tertiary winding,
   a plurality of further windings selectively connected to the primary winding, and
   a plurality of solid state selectors respectively coupled to each of the plurality of further windings and selectively connecting and bypassing the further winding in series with one of the primary winding and the secondary winding.

22. The apparatus according to claim 21, wherein the primary winding and secondary winding have a wye configuration, and the tertiary winding has a delta configuration.

* * * * *